(12) United States Patent
Gibson et al.

(10) Patent No.: US 8,346,226 B2
(45) Date of Patent: Jan. 1, 2013

(54) METHOD AND SYSTEM FOR CREATING A WEB LISTING USING A MOBILE PHONE

(75) Inventors: Kristina Gibson, San Francisco, CA (US); Ben Ross, San Francisco, CA (US); Christopher W. Phillips, Berkeley, CA (US); Tonya Rado, San Francisco, CA (US); Manish R. Shah, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 332 days.

(21) Appl. No.: 12/697,462

(22) Filed: Feb. 1, 2010

(65) Prior Publication Data

US 2011/0189979 A1    Aug. 4, 2011

(51) Int. Cl.
*H04M 3/42* (2006.01)
(52) U.S. Cl. ........... 455/414.1; 455/412.2; 455/412.1; 455/550.1; 455/466; 455/566; 705/14.4; 705/14.53; 705/14.23
(58) Field of Classification Search ........... 455/414.1, 455/412.1, 412.2, 466, 566, 550.1; 705/51, 705/7.31, 7.32, 7.37, 14.4, 14.53, 14.23, 705/346
See application file for complete search history.

(56) References Cited

U.S. PATENT DOCUMENTS

| | | | |
|---|---|---|---|
| 2008/0262929 A1 | 10/2008 | Behr | |
| 2009/0248742 A1* | 10/2009 | Krishnamurthy et al. | 707/104.1 |
| 2010/0033233 A1 | 2/2010 | Kwon | |
| 2010/0057567 A1 | 3/2010 | Desu | |
| 2010/0332339 A1* | 12/2010 | Patel et al. | 705/26 |
| 2011/0161152 A1 | 6/2011 | Kash et al. | |
| 2011/0258137 A1* | 10/2011 | Pasta | 705/347 |
| 2012/0232994 A1* | 9/2012 | Kim et al. | 705/14.58 |

OTHER PUBLICATIONS

Gibson et al., "Method and System for Creating/Updating Customer Lists and Profiles," U.S. Appl. No. 12/651,965, filed Jan. 4, 2010.

* cited by examiner

*Primary Examiner* — Ajit Patel
*Assistant Examiner* — Khai M Nguyen
(74) *Attorney, Agent, or Firm* — McKay and Hodgson, LLP; Philip McKay; Sean P. Lewis (57) ABSTRACT

A method and system for creating a web listing using a mobile phone whereby a user, typically a business owner or a representative of the business, provides information/data associated with the business to a mobile application including an on-line directory service using a merchant mobile phone, or other mobile computing system, associated with the user and/or the business and/or a mobile application, and/or an SMS and/or another mobile communications network. The information associated with the business provided via the merchant mobile phone, or other mobile computing system, is then used by the on-line directory service to create an on-line presence for the business such as, but not limited to, an on-line web-listing for the business in the on-line directory that includes at least part of the information associated with the business provided via the merchant mobile phone, or other mobile computing system.

17 Claims, 3 Drawing Sheets

METHOD AND SYSTEM FOR CREATING A WEB LISTING USING A MOBILE PHONE

BACKGROUND

Given the unprecedented growth of the Internet and electronic commerce over the past two decades, virtually every business owner desires to establish a presence on the Internet, i.e., a "web presence" for their business. However, many business owners do not have easy, or regular, access to traditional computing systems or the Internet. This is particularly an issue in emerging economies, such as in India, China, and Africa, where a personal computer often represents a significant investment and where Internet access is often unavailable, particularly in relatively remote locations.

However, even in so called "developed" nations, many business owners do not wish to devote the time and/or money required to create a traditional website. This is particularly true for businesses that do not require the depth and detail of a traditional web-site to advertise their business.

In addition, many customers of businesses now access the internet through mobile devices that typically have smaller display screens, less memory space, less processing power, and therefore slower Internet access and download speeds, than traditional computing systems. As a result, many businesses do not need or desire a traditional in-depth web-site to target these mobile customers. In addition, many business owners themselves are now highly mobile and therefore do not regularly have access to a traditional computing system or the Internet, even though they may own a traditional computing system and/or already have an Internet Service Provider.

As a result of the situation described above, many business owners who desire an Internet or web presence for their businesses currently do not have the resources, capability, time, or need, or motivation, to create a traditional website. Consequently, these business owners currently lose a significant opportunity to advertise via the Internet. In addition, consumers are also denied the opportunity to find the products and services offered by these businesses that they desire.

SUMMARY

In accordance with one embodiment, a method and system for creating a web listing using a mobile phone includes a process for creating a web listing using a mobile phone whereby, in one embodiment, a user, typically a business owner or a representative of the business, provides information/data associated with the business to a mobile application including an on-line directory service using a merchant mobile phone, or other mobile computing system, associated with the user and/or the business, and/or a Short Message Service (SMS) message and network, and/or other mobile communication network. In one embodiment, the user provides the information/data associated with the business as part of the subscription process to the mobile application and/or on-line directory service. In one embodiment, the obtained information associated with the business includes, but is not limited to, any of the following information: the business name; the business location/address; phone numbers associated with the business; and/or any other data desired by the provider of the on-line directory service and/or the user. In one embodiment, the information associated with the business provided via the merchant mobile phone, or other mobile computing system, is then used by the on-line directory service to create an on-line presence for the business such as, but not limited to, an on-line web-listing for the business in the on-line directory that includes at least part of the information associated with the business provided via the merchant mobile phone, or other mobile computing system.

Using one embodiment of the method and system for creating a web listing using a mobile phone, discussed herein, small business owners, or other merchants and/or product marketers, can establish an Internet or web presence for their businesses without having to dedicate the resources and time needed to create a traditional website. Consequently, these business owners can easily and efficiently seize the opportunity to advertise via the Internet and consumers can be provided the opportunity to find the products and services offered by these businesses that they desire.

As discussed in more detail below, using the below embodiments, with little or no modification and/or user input, there is considerable flexibility, adaptability, and opportunity for customization to meet the specific needs of various users under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

Hardware Architecture

In accordance with one embodiment, a method and system for creating a web listing using a mobile phone includes a process for creating a web listing using a mobile phone whereby, in one embodiment, a user, typically a business owner or a representative of the business, provides information/data associated with the business to a mobile application including an on-line directory service using a merchant mobile phone, or other mobile computing system, associated with the user and/or the business, and/or a mobile application or an SMS. In one embodiment, the user provides the information/data associated with the business as part of the subscription process to the mobile application and/or on-line directory service. In one embodiment, the obtained information associated with the business includes, but is not limited to, any of the following information: the business name; the business location/address; long and/or short code phone numbers associated with the business; and/or any other data desired by the provider of the on-line directory service and/or the user. In one embodiment, the information associated with the business provided via the merchant mobile phone, or other mobile computing system, is then used by the on-line directory service to create an on-line presence for the business such as, but not limited to, an on-line web-listing for the business in the on-line directory that includes at least part of the information associated with the business provided via the merchant mobile phone, or other mobile computing system.

Herein, the terms "mobile phone", "mobile computing system", and "mobile device" are used interchangeably and include, but are not limited to: a cellular telephone; a smart phone; a digital wireless telephone; a Personal Digital Assistant (PDA); a portable computer; a two-way pager; a media player, i.e., an MP3 player and/or other music and/or video player; an Internet appliance; or any other device that includes components that can execute all, or part, of any one of the processes and/or operations as described herein. In addition, as used herein, the term mobile computing system, can denote, but is not limited to, computing systems made up of multiple: wireless devices; cellular telephones; digital telephones; two-way pagers; PDAs; media players; or any desired combination of these devices, that are coupled to perform the processes and/or operations as described herein.

In one embodiment, at least part of the information associated with the business is obtained from the user via the merchant mobile phone, or other mobile computing system, as data via a mobile application or program stored, at least in part, on the merchant mobile phone, or other mobile computing system. In one embodiment, the mobile application is stored, at least in part, on the merchant mobile phone, or other mobile computing system, in a memory associated with the merchant mobile phone, or other mobile computing system.

In one embodiment, the user enters the information associated with the business as data via the mobile application and/or a user interface screen displayed to the user on a display device of the merchant mobile phone, or other mobile computing system, using a user interface device, such as a keypad, touch screen, voice recognition software, or any other mechanism and/or method for entering data into the merchant mobile phone, or other mobile computing system.

In one embodiment, at least part of the information associated with the business is obtained from the user via the merchant mobile phone, or other mobile computing system, and/or a mobile application, SMS message and/or network, or other mobile communication network, as data during the process of the user specifically subscribing to, or signing up for, the on-line directory service.

In one embodiment, at least part of the information associated with the business is obtained from the user as data via the merchant mobile phone, or other mobile computing system, and/or a mobile application, SMS message and/or network, or other mobile communication network, during the process of the user subscribing to, or obtaining, the mobile application that includes the on-line directory service.

In one embodiment, at least part of the information associated with the business is obtained from the user as data via the merchant mobile phone, or other mobile computing system, and/or a mobile application, SMS message and/or network, or other mobile communication network, as part of the process of the user signing up and/or creating an account with, or through, the mobile application and creating a customizable virtual mobile number, i.e., a long code or short code. Herein, the term "long code" includes a reception mechanism often used by businesses to receive SMS messages and voice calls. Long codes are typically internationally available and enable businesses to have their own number, rather than short codes which are generally shared across a lot of brands.

In one embodiment, at least some of the information associated with the business obtained through the mobile phone, and/or other mobile computing system, is basic identification information about the business, and is captured as data during the subscription process, and/or account creation process, for the mobile application and then this information/data is used to auto populate one or more fields and/or interface screens displayed to the user on a display device of the mobile phone for creating an online web-listing.

In one embodiment, the information associated with the business obtained through the mobile phone, and/or other mobile computing system, and/or a mobile application, SMS message and/or network, or other mobile communication network, includes, but is not limited to, data representing any of the following information: the business name; the business location/address; long and/or short code phone numbers associated with the business; basic inventory and services provided data; and/or any other data desired by the provider of the on-line directory service and/or the user.

In one embodiment, the information associated with the business obtained through the mobile phone, and/or other mobile computing system, and/or a mobile application, SMS message and/or network, or other mobile communication network, is then transferred as data from the mobile application to a computing system that in turn posts the information associated with the business, including in one embodiment, the long code associated with the business, to an on-line web listing that is stored, and/or displayed, and/or accessible, in the on-line directory along with other business listings.

In one embodiment, the on-line directory service provides one or more on-line web listings for one or more businesses under the same domain, i.e., a domain associated with the on-line directory service. As a specific example, in one embodiment, a given business, ABC rental, may be provided business listings by on-line directory service ACME as www.ACME.ABCrental.com.

In one embodiment, the on-line directory service provides one or more on-line web listings for one or more businesses each having its own associated domain. Continuing with the specific example above, in one embodiment, a given business, ABC rental, may be provided business listings by on-line directory service ACME as www.ABCrental.com.

In one embodiment, the on-line web-listing for the business in the on-line directory includes at least part of the information associated with the business provided via the merchant mobile phone, or other mobile computing system, displayed as simple text. In one embodiment, the on-line web-listing for the business in the on-line directory includes at least part of the information associated with the business provided via the merchant mobile phone, or other mobile computing system, and supplementary features such as an uploaded logo, icon, or other image/graphic. In one embodiment, the supplementary features are added after the creation of the on-line web-listing and, in one embodiment, using a traditional computing system and/or Internet access.

In one embodiment, the mobile application provides the user the capability to obtain and store contact information for one or more current and/or potential customers of the business in the mobile application. In one embodiment, once the information associated with the business is obtained through the mobile phone, and/or other mobile computing system, and the on-line web-listing for the business is created, the user is prompted to distribute at least part of the information associated with the business and/or the on-line web-listing address for the business to their customers using this contact information. This distribution will then begin virally spreading information about the business to help get the business discovered both on-line and via mobile computing systems.

In one embodiment, the mobile application provides the user with the capability to create and/or distribute a mobile computing system based marketing device, such as a Short Message Service (SMS) message, that is associated with one or more products and/or services. In one embodiment, the mobile computing system based marketing device is designed to be distributed via mobile computing systems and/or networks. Herein, the term "marketing device" is used to denote any advertisements, coupons, discount certificates, discount vouchers, sales offers, and/or any other marketing tool and/or device and/or offer that is presented, and/or offered to, and/or obtained by, any customer/consumer in any format.

In one embodiment, the mobile computing system based marketing device includes customizable content. In one embodiment, the customizable content takes the form of one or more "hooks". In one embodiment, the one or more hooks are presented to the mobile customers as part of the mobile computing system based marketing device and appear within the computing system based marketing device, for instance at the beginning, or end, of the computing system based marketing device.

In one embodiment, once the information associated with the business is obtained through the mobile phone, and/or other mobile computing system, and/or a mobile application, SMS message and/or network, or other mobile communication network, and the on-line web-listing for the business is created, the user is prompted to distribute at least part of the information associated with the business and/or the on-line web-listing address for the business out to their customers along with one or more of these computing system based marketing devices. In various embodiments, by distributing one or more computing system based marketing devices along with at least part of the information associated with the business and/or the on-line web-listing address for the business to potential customer right after the creation of the on-line web-listing, the user can increase the spread of their viral network and can track which customers received and/or redeemed the one or more computing system based marketing devices.

In various embodiments, once the information associated with the business is obtained through the mobile phone, and/or other mobile computing system, and/or a mobile application, SMS message and/or network, or other mobile communication network, and the on-line web-listing for the business is created, the user can use the mobile web or a WAP version of the mobile application to view their on-line web-listing on the merchant mobile phone, or other mobile computing system, or the user can view, and/or edit, the on-line web-listing for the business using a traditional computing system with Internet access.

Figure 1:
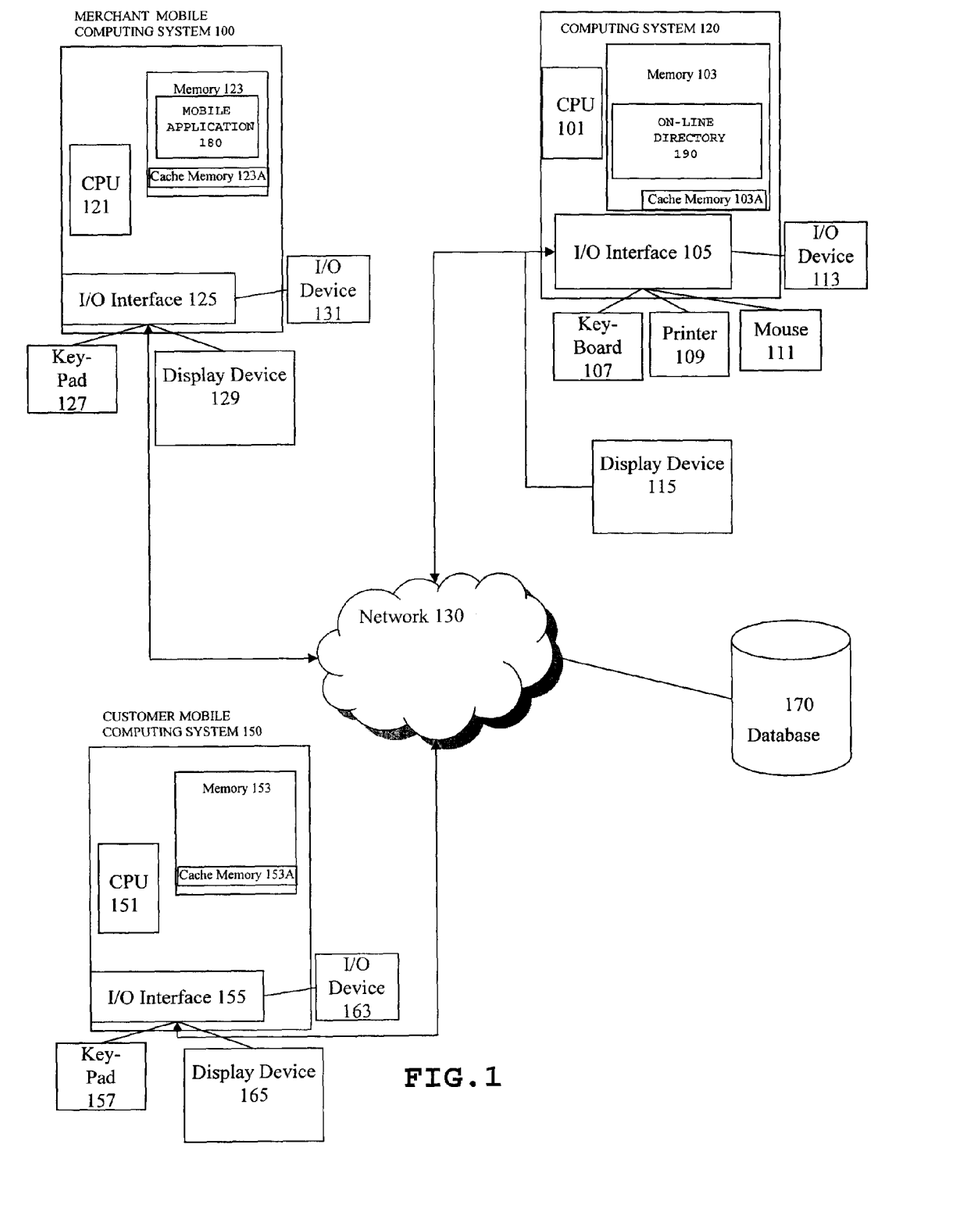
FIG. 1 is a block diagram of an exemplary hardware architecture for implementing one embodiment including a computing system, a mobile computing system; a communication network, and a database, in accordance with one embodiment.

FIG. 1 is a block diagram of an exemplary hardware architecture for implementing one embodiment of a system and method for creating a web listing using a mobile phone, such as exemplary process 300 discussed herein, that includes: a merchant mobile computing system 100, i.e., a merchant mobile phone; a computing system 120, i.e., an on-line directory computing system; a customer mobile computing system 150; and a database 170, all operatively coupled by a network 130.

As seen in FIG. 1, in one embodiment, merchant mobile computing system 100 can include a CPU 121, an input/output (I/O) interface 125, and a memory system 123, including cache memory 123A. In one embodiment, merchant mobile computing system 100 may further include standard user interface devices such as a keypad 127, a keyboard, a touchpad, and a display device 129, as well as, one or more standard input/output (I/O) devices 131, such as a USB port or another digital or waveform port, or other device capable of inputting data to, and outputting data from, merchant mobile computing system 100, whether available or known at the time of filing or as later developed.

In one embodiment, merchant mobile computing system 100 is representative of multiple mobile computing systems. As used herein, the term "mobile computing system" includes, but is not limited to: a cellular telephone; a smart phone; a digital wireless telephone; a Personal Digital Assistant (PDA); a portable computer; a two-way pager; a media player, i.e., an MP3 player and/or other music and/or video player; a server computer; an Internet appliance; or any other device that includes components that can execute all, or part, of any one of the processes and/or operations as described herein. In addition, as used herein, the term mobile computing system, can denote, but is not limited to, computing systems made up of multiple: wireless devices; cellular telephones; digital telephones; two-way pagers; PDAs; media players; or any desired combination of these devices, that are coupled to perform the processes and/or operations as described herein.

In various embodiments, merchant mobile computing system 100 can be any mobile computing system as defined herein, and/or as known in the art at the time of filing, and/or as developed thereafter, that includes components that can execute all, or part, of a process for creating a web listing using a mobile phone in accordance with at least one of the embodiments as described herein.

In one embodiment, memory system 123 includes all, or part of, mobile application 180 for implementing at least part of a process for creating customer lists using mobile computing systems. In one embodiment, mobile application 180 is stored, in whole, or in part, in memory system 123, and is used by, associated with, or includes, as discussed below, instructions and/or data associated with at least part of a process for creating a web listing using a mobile phone, such as exemplary process 300 discussed below.

In one embodiment, all, or part of: electronic data representing a mobile computing system based marketing device, such as a Short Message Service (SMS) message, and/or a process for creating a web listing using a mobile phone; can be loaded/transmitted, in whole, or in part, to merchant mobile computing system 100 from computing system 120 for storage in memory system 123 and/or cache memory 123A.

As also seen in FIG. 1, computing system 120 typically includes a central processing unit (CPU) 101, an input/output (I/O) interface 105, and a memory system 103, including cache memory 103A. In one embodiment, memory system 103 includes all, or part of, instructions and/or data associated with an on-line directory 190, including data associated with one or more individual on-line web listings for one or more individual businesses. In one embodiment, all, or part of, the instructions and/or data associated with an on-line directory 190, including data associated with one or more individual on-line web listings for one or more individual businesses, is stored, in whole, or in part, in memory system 103, and is used by, associated with, or includes, as discussed below, all or part of a process for creating a web listing using a mobile phone, such as exemplary process 300 discussed below.

Computing system 120 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 120, whether available or known at the time of filing or as later developed.

In one embodiment, all, or part of: a process for creating a web listing using a mobile phone; a mobile application for implementing at least part of a process for creating a web listing using a mobile phone; data representing an on-line directory, including data associated with one or more individual on-line web listings for one or more individual businesses; a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; is stored, in whole, or in part, in memory 103 of mobile computing system 120.

In one embodiment, all, or part of: a process for creating a web listing using a mobile phone; mobile application 180 for implementing at least part of a process for creating a web listing using a mobile phone; data representing a listing of one or more potential mobile customers and mobile computing system contact information for the potential mobile customers; data representing an on-line directory 190, including data associated with one or more individual on-line web listings for one or more individual businesses; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; are entered, in whole, or in part, into computing system 120 via I/O device 113, such as from a CD, DVD, floppy disk, portable hard drive, memory stick, download site, or other medium and/or computer program product as defined herein.

In one embodiment, computing system 120 is a server computing system that in turn posts the information associated with the business, including in one embodiment, the long code associated with the business, to an on-line web listing that is stored, and/or displayed, and/or accessible, in the on-line directory along with other business listings.

As used herein, the term "computing system" includes, but is riot limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, computing system 120 is a computing system used and/or accessible by another computing system, such as merchant mobile computing system 100, and mobile application 180, and/or customer mobile computing system 150 (discussed below), that, in various embodiments, are, but are not limited to, a cellular telephone, a smart phone, a digital wireless telephone, a Personal Digital Assistant (PDA), a two-way pager, a mobile server computer, an Internet appliance, any other device, or any desired combination of these devices, that includes components that can execute all, or part, of a process for creating a web listing using a mobile phone, in accordance with at least one of the embodiments as described herein.

In one embodiment, computing system 120 is associated with any, but not limited to, one or more of the following: a provider of the process for creating a web listing using a mobile phone; a provider of a mobile application; one or more users; or any third party.

In one embodiment, computing system 120 is representative of two or more computing systems. In one embodiment, computing system 120 is a client computing system associated with one or more server computing systems. In one embodiment, computing system 120 is a server computing system that is, in turn, associated with one or more client computing systems. In one embodiment, computing system 120 is part of a cloud computing environment.

As also seen in FIG. 1, in one embodiment, customer mobile computing system 150 can include a CPU 151, an input/output (I/O) interface 155, and a memory system 153, including cache memory 153A. In one embodiment, customer mobile computing system 150 may further include standard user interface devices such as a keypad 157, a keyboard, a touch pad, and a display device 165, as well as, one or more standard input/output (I/O) devices 163, such as a compact disk (CD) or DVD drive, floppy disk drive, or other digital or waveform port, or other device capable of inputting data to, and outputting data from, customer mobile computing system 150, whether available or known at the time of filing or as later developed.

In one embodiment, customer mobile computing system 150 is representative of multiple mobile computing systems. In various embodiments, customer mobile computing system 150 can be any mobile computing system as defined herein, and/or as known in the art at the time of filing, and/or as developed thereafter, that includes components that can execute all, or part, of a process for creating a web listing using a mobile phone in accordance with at least one of the embodiments as described herein.

In one embodiment, all, or part of: electronic data representing a mobile computing system based marketing device, such as a Short Message Service (SMS) message, and/or a process for creating a web listing using a mobile phone; can be loaded/transmitted, in whole, or in part, to customer mobile computing system 150 from computing system 120 and/or server system 120 and/or another data source, for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing system(s) 100, 120 and/or 150, or a distributed database, or an external and/or portable hard drive. In one embodiment, database 170 is a dedicated mass storage device implemented in software, hardware, or a combination of hardware and software. In one embodiment, database 170 is an on-line directory data base including data associated with all of part of an on-line directory, including data associated with one or more individual on-line web listings for one or more individual businesses.

In one embodiment, database 170 is a mobile customer database that includes data representing a listing of one or more potential mobile customers, mobile computing system contact information for the potential mobile customers, and/or mobile customer profiles for one or more potential mobile customers.

In addition, in one embodiment, all, or part of: a process for creating a web listing using a mobile phone; a mobile application for implementing at least part of a process for creating a web listing using a mobile phone; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; are stored in whole, or in part, in database 170.

In one embodiment, database 170 is a web-based function. As discussed in more detail below, in one embodiment, database 170 is under the control of, or otherwise accessible by, a process for creating a web listing using a mobile phone, and/or a mobile application implementing at least part of the process for creating a web listing using a mobile phone. In one embodiment, database 170 is part of a cloud computing environment.

In one embodiment, computing systems 100, 120, and 150, and database 170, are coupled through network 130. In various embodiments, network 130 is any network, communications network, or network/communications network system such as, but not limited to: SMS network; a mobile phone communications network; any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Those of skill in the art will readily recognize that the components shown in FIG. 1, such as computing system 120, merchant mobile computing system 100, customer mobile computing system 150, and database 170, and their respective components, are shown for illustrative purposes only and that architectures with more or fewer components can implement, and benefit from, the invention. Moreover, one or more components of computing system 120, merchant mobile computing system 100, customer mobile computing system 150, and database 170, may be located remotely from their respective system and accessed via network, as discussed herein. In addition, the particular type of, and configuration of, computing system 120, merchant mobile computing system 100, customer mobile computing system 150, and database 170, are not relevant.

As discussed in more detail below, in one embodiment, a process for creating a web listing using a mobile phone; a mobile application for implementing at least part of a process for creating a web listing using a mobile phone; data associated with an on-line directory, including data associated with one or more individual on-line web listings for one or more individual businesses; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles are stored, in whole, or in part, in memory system 103 and/or cache memory 103A, of computing system 120, and/or memory system 123 and/or cache memory 123A of merchant mobile computing system 150, and/or memory system 153 and/or cache memory 153A of customer mobile computing system 150, and/or in database 170, and executed on computing system 120, and/or merchant mobile computing system 100, and/or customer mobile computing system 150. As used herein, a memory refers to a volatile memory, a non-volatile memory, or any combination of the two.

Although a process for creating a web listing using a mobile phone, such as process for creating a web listing using a mobile phone 300, and/or a mobile application for implementing at least part of a process for creating a web listing using a mobile phone, such as mobile application 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for creating a web listing using a mobile phone, such as process for creating a web listing using a mobile phone 300, and/or a mobile application for implementing at least part of a process for creating a web listing using a mobile phone, such as mobile application 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 121, and 151. In one embodiment, execution of a process by CPU 101, CPU 121, and/or CPU 151, results in the operations of an agent computer process (not shown) and/or a rule computer process (not shown).

In one embodiment, a process for creating a web listing using a mobile phone; a mobile application for implementing at least part of a process for creating a web listing using a mobile phone; data associated with an on-line directory, including data associated with one or more individual on-line web listings for one or more individual businesses; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and nonvolatile memory sticks, servers on a network, and signals transmitted over a network, such as network 130 of FIG. 1, or other media or process capable of delivering computer readable data representing computer readable code, whether available or known at the time of filing or as later developed. This medium may belong to a computing system, such as computing system 120, merchant mobile computing system 100, and customer mobile computing system 150 of FIG. 1, described above. However, in some embodiments, the medium also may be removable and/or remote from the computing system.

For example, all, or part, of a process for creating a web listing using a mobile phone; a mobile application for implementing at least part of a process for creating a web listing using a mobile phone; data representing a listing of one or more potential mobile customers and mobile computing system contact information for the potential mobile customers; data associated with an on-line directory, including data associated with one or more individual on-line web listings for one or more individual businesses; data representing one or more mobile computing system based marketing devices and/ or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles may be stored in a memory that is physically located in a location, such as a server system memory, or database 170, of FIG. 1, different from a computing system, such as computing system 120, merchant mobile computing system 100 and customer mobile computing system 150 of FIG. 1, utilizing a process for creating a web listing using a mobile phone; mobile application 180 for implementing at least part of a process for creating a web listing using a mobile phone; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles.

In one embodiment, all, or part, of a process for creating a web listing using a mobile phone; a mobile application for implementing at least part of a process for creating a web listing using a mobile phone; data associated with an on-line directory, including data associated with one or more individual on-line web listings for one or more individual businesses; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/ or various analysis data associated with one or more mobile customer profiles are stored separate from the computing system's processor(s), such as CPUs 101, CPUs 121, and 151 of FIG. 1, and the computing system CPUs can be coupled to the memory in a client-server system, or, alternatively, via connection to another computer, such as computing system 120, merchant mobile computing system 100 and customer mobile computing system 150 of FIG. 1, via modems and analog lines, digital interfaces and a digital carrier line, or wireless or cellular connections.

Figure 2:
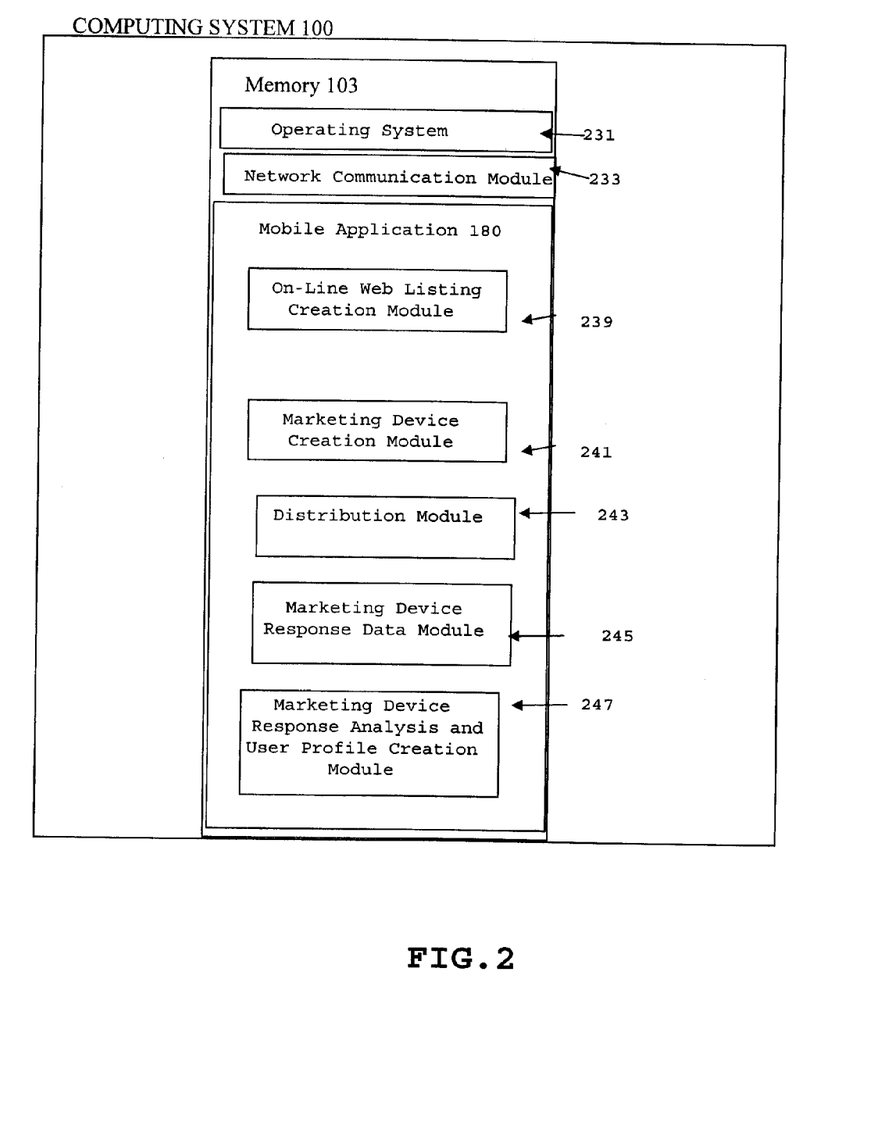
FIG. 2 is a block diagram of a exemplary memory system associated with the computing system of FIG. 1, in accordance with one embodiment.

FIG. 2 is a more detailed block diagram of memory system 103 of computing system 120 of FIG. 1. As seen in FIG. 2, memory system 103 can store data and/or instructions associated with, but not limited to, the following elements, subsets of elements, and/or super sets of elements for processing by one or more processors: operating system 231 that includes procedures, data, and/or instructions for handling various services and performing/coordinating hardware dependent tasks; network communications module 233 that includes procedures, data, and/or instructions, for connecting computing system 120 to other computing systems, such as other computing systems 100, and/or merchant mobile computing system 100 of FIG. 1, and/or customer mobile computing system 150 of FIG. 1, and/or a network, such as network 130 of FIG. 1, and/or a database, such as database 170 of FIG. 1; and mobile application module 180 that includes procedures, data, and/or instructions, associated with a mobile application for implementing at least part of a process for creating customer lists using mobile computing systems.

As also seen in FIG. 2, mobile application module 180 includes on-line web-listing creation module 239 that includes procedures, data, and/or instructions, associated with implementing a process for creating a web listing using a mobile phone and/or creating one or more on-line web-listings for one or more businesses.

As also seen in FIG. 2, mobile application module 180 includes marketing device creation module 241 that includes procedures, data, and/or instructions, associated with creating one or more mobile computing system based marketing devices, such as an Short Message Service (SMS) message, that is associated with one or more products and/or services and includes one or more hooks that are presented to the mobile customers as part of the mobile computing system based marketing device.

As also seen in FIG. 2, in one embodiment, mobile application module 180 includes distribution module 243 that includes procedures, data, and/or instructions, for distributing at least part of the information associated with the business, and/or the on-line web-listing address for the business, and/or the one or more mobile computing system based marketing devices of marketing device creation module 241 to selected mobile customers via their mobile computing systems and/or one or more mobile computing system networks.

As also seen in FIG. 2, in one embodiment, mobile application module 180 includes marketing device response data module 245 that includes procedures, data, and/or instructions, associated with monitoring, obtaining, generating, and storing response data of the selected mobile customers that receive the one or more mobile computing system based marketing devices of marketing device creation module 241 via distribution module 243 including, but not limited to, data indicating: whether or not a given mobile customer was interested in the product and/or service that was the subject of the mobile computing system based marketing device; whether or not a given mobile customer was interested in the terms of the offer that was provided via the mobile computing system based marketing device; any mobile customers that do not wish to be sent future mobile computing system based marketing devices associated with product and/or service that was the subject of the mobile computing system based marketing device; any mobile customers that do wish to be sent future mobile computing system based marketing devices associated with product and/or service that was the subject of the mobile computing system based marketing device; if the mobile computing system based marketing devices are reaching the mobile customers; any mobile customers that indicate an interest in the offer that was provided via the mobile computing system based marketing device but then failed to use/redeem the offer; any mobile customers that failed indicate an interest in the offer that was provided via the mobile computing system based marketing device but did use/redeem the offer; how many, or a percentage of, mobile customers responded at all to the mobile computing system based marketing device; and/or any other response data that is desired by the given merchant and that can be obtained using a mobile computing system based marketing device and one or more hooks.

As also seen in FIG. 2, in one embodiment, mobile application module 180 includes marketing device response analysis and user profile creation module 247 that includes procedures, data, and/or instructions, associated with obtaining, analyzing, creating and storing mobile customer profile in a mobile customer profile account for the selected mobile customer in a mobile customer database and/or to update an existing profile account previously created for the selected mobile customer in the mobile customer database. In one embodiment, marketing device response analysis and user profile creation module 247 includes procedures, data, and/or instructions, associated with analyzing the mobile customer profile data to determine one or more of, but not limited to, the following: which of the selected mobile customers will be sent subsequent mobile computing system based marketing devices; the terms of any mobile computing system based marketing devices to be sent to the selected mobile customers; the effectiveness of the mobile computing system based marketing devices; the desirability of the one or more products and/or services that are the subject of the mobile computing system based marketing devices; any other mobile customer, product and/or service data, and/or marketing data desired by the merchant and/or product marketer that can be determined by the correlated response data for each selected mobile customer using any methods, means, mechanisms, procedures and/or processes discussed herein, and/or known in the art at the time of filing, and/or as developed after the time of filing.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

Process

In accordance with one embodiment, a method and system for creating a web listing using a mobile phone includes a process for creating a web listing using a mobile phone whereby, in one embodiment, a user, typically a business owner or a representative of the business, provides information/data associated with the business to a mobile application including an on-line directory service using a merchant mobile phone, or other mobile computing system, associated with the user and/or the business. In one embodiment, the user provides the information/data associated with the business as part of the subscription process to the mobile application and/or on-line directory service. In one embodiment, the obtained information associated with the business includes, but is not limited to, any of the following information: the business name; the business location/address; long and/or short code phone numbers associated with the business; and/or any other data desired by the provider of the on-line directory service and/or the user. In one embodiment, the information associated with the business provided via the merchant mobile phone, or other mobile computing system, is then used by the on-line directory service to create an on-line presence for the business such as, but not limited to, an on-line web-listing for the business in the on-line directory that includes at least part of the information associated with the business provided via the merchant mobile phone, or other mobile computing system.

Figure 3:
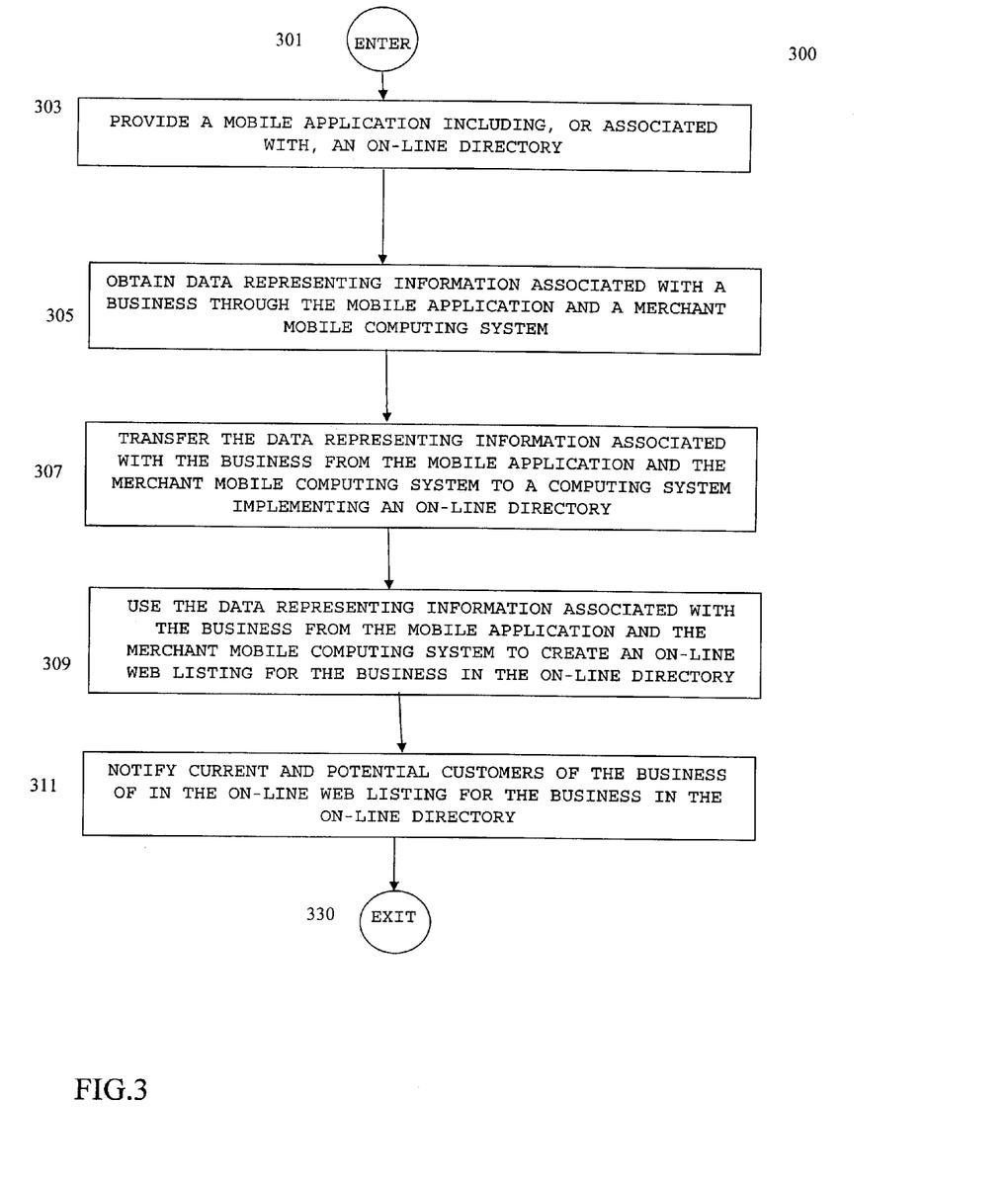
FIG. 3 is a flow chart depicting a process for creating a web listing using a mobile phone in accordance with one embodiment.

FIG. 3 is a flow chart depicting a process for creating a web listing using a mobile phone 300 in accordance with one embodiment. Process for creating a web listing using a mobile phone 300 begins at ENTER OPERATION 301 of FIG. 3 and process flow proceeds to PROVIDE A MOBILE APPLICATION INCLUDING, OR ASSOCIATED WITH, AN ON-LINE DIRECTORY OPERATION 303.

In one embodiment, at PROVIDE A MOBILE APPLICATION INCLUDING, OR ASSOCIATED WITH, AN ON-LINE DIRECTORY OPERATION 303 a mobile application including, or associated with, an on-line directory service is provided for a merchant mobile phone, or other mobile computing device.

As noted above, herein, the terms "mobile phone", "mobile computing system", and "mobile device" are used interchangeably and include, but are not limited to: a cellular telephone; a smart phone; a digital wireless telephone; a Personal Digital Assistant (PDA); a portable computer; a two-way pager; a media player, i.e., an MP3 player and/or other music and/or video player; an Internet appliance; or any other device that includes components that can execute all, or part, of any one of the processes and/or operations as described herein. In addition, as used herein, the term mobile computing system, can denote, but is not limited to, computing systems made up of multiple: wireless devices; cellular telephones; digital telephones; two-way pagers; PDAs; media players; or any desired combination of these devices, that are coupled to perform the processes and/or operations as described herein.

In one embodiment, the mobile application provided at PROVIDE A MOBILE APPLICATION INCLUDING, OR ASSOCIATED WITH, AN ON-LINE DIRECTORY OPERATION 303 is a mobile application, such as mobile application 180 of FIG. 1, stored, at least in part, on a merchant mobile phone, or other mobile computing system, such as merchant mobile computing system 100 of FIG. 1. In one embodiment, the mobile application is stored, at least in part, on the merchant mobile phone, or other mobile computing system, in a memory associated with the merchant mobile phone, or other mobile computing system, such as memory 123 of merchant mobile computing system 100 of FIG. 1.

Returning to FIG. 2, as discussed below, in one embodiment, the mobile application provided at PROVIDE A MOBILE APPLICATION INCLUDING, OR ASSOCIATED WITH, AN ON-LINE DIRECTORY OPERATION 303 includes an on-line directory service that is subscribed to by a user, in one embodiment, via a merchant mobile phone, or other mobile computing system, such as merchant mobile computing system 100 of FIG. 1.

Returning to FIG. 2, as discussed below, in one embodiment, the mobile application provided at PROVIDE A MOBILE APPLICATION INCLUDING, OR ASSOCIATED WITH, AN ON-LINE DIRECTORY OPERATION 303 is a mobile application for creating a customizable virtual mobile number, i.e., a long code or short code, that is subscribed to, or signed up for, by a user, in one embodiment, via a merchant mobile phone, or other mobile computing system, such as merchant mobile computing system 100 of FIG. 1.

Returning to FIG. 2, as discussed below, in one embodiment, the mobile application provided at PROVIDE A MOBILE APPLICATION INCLUDING, OR ASSOCIATED WITH, AN ON-LINE DIRECTORY OPERATION 303 provides the user the capability to obtain and store contact information for one or more current and/or potential customers of the business in the mobile application.

In one embodiment, as discussed below, the mobile application provided at PROVIDE A MOBILE APPLICATION INCLUDING, OR ASSOCIATED WITH, AN ON-LINE DIRECTORY OPERATION 303 provides the user with the capability to create and/or distribute a mobile computing system based marketing device, such as a Short Message Service (SMS) message, that is associated with one or more products and/or services.

In one embodiment, once a mobile application including, or associated with, an on-line directory service is provided at PROVIDE A MOBILE APPLICATION INCLUDING, OR ASSOCIATED WITH, AN ON-LINE DIRECTORY OPERATION 303, process flow proceeds to OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 a user, typically a business owner or a representative of the business, provides information/data associated with a business to the mobile application of PROVIDE A MOBILE APPLICATION INCLUDING, OR ASSOCIATED WITH, AN ON-LINE DIRECTORY OPERATION 303 using a merchant mobile phone, or other mobile computing system, associated with the user and/or the business, and/or a mobile application or an SMS.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 at least part of the information associated with the business is obtained from the user via the merchant mobile phone, or other mobile computing system, and/or a mobile application, SMS message and/or network, or other mobile communication network, as data via the mobile application of PROVIDE A MOBILE APPLICATION INCLUDING, OR ASSOCIATED WITH, AN ON-LINE DIRECTORY OPERATION 303, implementing at least in part, on the merchant mobile phone, or other mobile computing system.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 the user enters the information associated with the business as data via the mobile application of PROVIDE A MOBILE APPLICATION INCLUDING, OR ASSOCIATED WITH, AN ON-LINE DIRECTORY OPERATION 303 and/or a user interface screen displayed to the user on a display device of the merchant mobile phone, or other mobile computing system, such as display device 129 of FIG. 1.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 the user enters the information associated with the business as data via the mobile application of PROVIDE A MOBILE APPLICATION INCLUDING, OR ASSOCIATED WITH, AN ON-LINE DIRECTORY OPERATION 303 and/or a user interface screen displayed to the user on a display device of the merchant mobile phone, or other mobile computing system, such as display device 129 of FIG. 1, using a user interface device, such as keypad 127 of FIG. 1, a touch screen, voice recognition software, or any other mechanism and/or method for entering data into the merchant mobile phone, or other mobile computing system.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 at least part of the information associated with the business is obtained from the user via the merchant mobile phone, or other mobile computing system, and/or a mobile application, SMS message and/or network, or other mobile communication network, as data during the process of the user specifically subscribing to, or signing up for, the on-line directory service included with, and/or associated with, the mobile application of PROVIDE A MOBILE APPLICATION INCLUDING, OR ASSOCIATED WITH, AN ON-LINE DIRECTORY OPERATION 303.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305, at least part of the information associated with the business is obtained from the user as data via the merchant mobile phone, or other mobile computing system, and/or a mobile application, SMS message and/or network, or other mobile communication network, during the process of the user subscribing to, or obtaining, the mobile application of PROVIDE A MOBILE APPLICATION INCLUDING, OR ASSOCIATED WITH, AN ON-LINE DIRECTORY OPERATION 303.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305, at least part of the information associated with the business is obtained from the user as data via the merchant mobile phone, or other mobile computing system, and/or a mobile application, SMS message and/or network, or other mobile communication network, as part of the process of the user signing up and/or creating an account with, or through, the mobile application of PROVIDE A MOBILE APPLICATION INCLUDING, OR ASSOCIATED WITH, AN ON-LINE DIRECTORY OPERATION 303 and creating a customizable virtual mobile number, i.e., a long code or short code.

Herein, the term "long code" includes a reception mechanism often used by businesses to receive SMS messages and voice calls. Long codes are typically internationally available and enable businesses to have their own number, rather than short codes which are generally shared across a lot of brands.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305, at least some of the information associated with the business obtained through the mobile phone, and/or other mobile computing system, and/or a mobile application, SMS message and/or network, or other mobile communication network, is basic identification information about the business, and is captured as data during the subscription process, and/or account creation process, for the mobile application of PROVIDE A MOBILE APPLICATION INCLUDING, OR ASSOCIATED WITH, AN ON-LINE DIRECTORY OPERATION 303. In one embodiment, this information/data is used to auto populate one or more fields and/or interface screens displayed to the user on a display device of the mobile phone for creating an online web-listing.

In one embodiment, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305, the information associated with the business obtained through the mobile phone, and/or other mobile computing system, and/or a mobile application, SMS message and/or network, or other mobile communication network, includes, but is not limited to, data representing any of the following information: the business name; the business location/address; long and/or short code phone numbers associated with the business; basic inventory and services provided data; and/or any other data desired by the provider of the on-line directory service and/or the user.

In one embodiment, once a user provides information/data associated with a business to the mobile application of PROVIDE A MOBILE APPLICATION INCLUDING, OR ASSOCIATED WITH, AN ON-LINE DIRECTORY OPERATION 303 using a merchant mobile phone, or other mobile computing system, associated with the user, and/or the business and/or a mobile application, SMS message and/or network, or other mobile communication network, at OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305, process flow proceeds to TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307.

In one embodiment, at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307 the information associated with the business obtained through the mobile phone, and/or other mobile computing system, and/or a mobile application, SMS message and/or network, or other mobile communication network, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is transferred as data from the mobile application of PROVIDE A MOBILE APPLICATION INCLUDING, OR ASSOCIATED WITH, AN ON-LINE DIRECTORY OPERATION 303 to a computing system that, as discussed below, in turn posts the information associated with the business, including in one embodiment, the long code associated with the business, to an on-line web listing that is stored, and/or displayed, and/or accessible, in the on-line directory of PROVIDE A MOBILE APPLICATION INCLUDING, OR ASSOCIATED WITH, AN ON-LINE DIRECTORY OPERATION 303.

In one embodiment, at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307 the information associated with the business obtained through the mobile phone, and/or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is transferred as data from the mobile application of PROVIDE A MOBILE APPLICATION INCLUDING, OR ASSOCIATED WITH, AN ON-LINE DIRECTORY OPERATION 303 to a computing system, such as computing system 120 of FIG. 1.

Returning to FIG. 3, in one embodiment, at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307 the information associated with the business obtained through the mobile phone, and/or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is transferred as data from the mobile application of PROVIDE A MOBILE APPLICATION INCLUDING, OR ASSOCIATED WITH, AN ON-LINE DIRECTORY OPERATION 303 to a computing system via a network, such as network 130 of FIG. 1.

Returning to FIG. 3, in one embodiment, at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLE- MENTING AN ON-LINE DIRECTORY OPERATION 307 the information associated with the business obtained through the mobile phone, and/or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is transferred as data from the mobile application of PROVIDE A MOBILE APPLICATION INCLUDING, OR ASSOCIATED WITH, AN ON-LINE DIRECTORY OPERATION 303 to a computing system using any method, means, process and/or procedure for transferring data discussed herein, and/or as known in the art at the time of filing, and/or as developed after the time of filing.

Returning to FIG. 3, in one embodiment, once the information associated with the business obtained through the mobile phone, and/or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is transferred as data from the mobile application of PROVIDE A MOBILE APPLICATION INCLUDING, OR ASSOCIATED WITH, AN ON-LINE DIRECTORY OPERATION 303 to a computing system that in turn posts the information associated with the business to an on-line web listing at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307, process flow proceeds to USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the information associated with the business, including in one embodiment, the long code associated with the business, obtained via the merchant mobile phone, or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 and transferred at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307 is used to create an on-line presence for the business such as, but not limited to, an on-line web-listing for the business in the on-line directory of PROVIDE A MOBILE APPLICATION INCLUDING, OR ASSOCIATED WITH, AN ON-LINE DIRECTORY OPERATION 303.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the information associated with the business, including in one embodiment, the long code associated with the business, obtained via the merchant mobile phone, or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is used to create an on-line web listing for the business.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the information associated with the business, including in one embodiment, the long code associated with the business, obtained via the merchant mobile phone, or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 is used to create on-line web listing for the business that is included in an on-line directory, such as on-line directory 190 of FIG. 1.

Returning to FIG. 3, in one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the on-line directory service provides one or more on-line web listings for one or more businesses under the same domain, i.e., a domain associated with the on-line directory service. As a specific example, in one embodiment, a given business, ABC rental, may be provided business listings by on-line directory service ACME as www.ACME.ABCrental.com.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the on-line directory service provides one or more on-line web listings for one or more businesses each having its own associated domain. Continuing with the specific example above, in one embodiment, a given business, ABC rental, may be provided business listings by on-line directory service ACME as www.ABCrental.com or www.ABCrental.ACME.com In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the on-line web-listing for the business in the on-line directory includes at least part of the information associated with the business provided via the merchant mobile phone, or other mobile computing system, at PROVIDE A MOBILE APPLICATION INCLUDING, OR ASSOCIATED WITH, AN ON-LINE DIRECTORY OPERATION 303 such as, but not limited to, any of the following information: the business name; the business location/address; long and/or short code phone numbers associated with the business; basic inventory and services provided data; and/or any other data desired by the provider of the on-line directory service and/or the user.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309 the on-line web-listing for the business in the on-line directory includes at least part of the information associated with the business provided via the merchant mobile phone, or other mobile computing system, displayed as simple text.

In one embodiment, at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309, the on-line web-listing for the business in the on-line directory includes at least part of the information associated with the business provided via the merchant mobile phone, or other mobile computing system, and supplementary features such as an uploaded logo, icon, or other image/graphic. In one embodiment, the supplementary features are added after the creation of the on-line web-listing and, in one embodiment, using a traditional computing system and/or Internet access.

In one embodiment, once the information associated with the business, including in one embodiment, the long code associated with the business, obtained via the merchant mobile phone, or other mobile computing system, of OBTAIN DATA REPRESENTING INFORMATION ASSOCIATED WITH A BUSINESS THROUGH THE MOBILE APPLICATION AND A MERCHANT MOBILE COMPUTING SYSTEM OPERATION 305 and transferred at TRANSFER THE DATA REPRESENTING INFORMATION ASSOCIATED WITH THE BUSINESS FROM THE MOBILE APPLICATION AND THE MERCHANT MOBILE COMPUTING SYSTEM TO A COMPUTING SYSTEM IMPLEMENTING AN ON-LINE DIRECTORY OPERATION 307 is used to create an on-line presence for the business such as, but not limited to, an on-line web-listing for the business in the on-line directory of PROVIDE A MOBILE APPLICATION INCLUDING, OR ASSOCIATED WITH, AN ON-LINE DIRECTORY OPERATION 303 at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309, process flow proceeds to NOTIFY CURRENT AND POTENTIAL CUSTOMERS OF THE BUSINESS OF IN THE ON-LINE WEB LISTING FOR THE BUSINESS IN THE ON-LINE DIRECTORY OPERATION 311.

In one embodiment, at NOTIFY CURRENT AND POTENTIAL CUSTOMERS OF THE BUSINESS OF IN THE ON-LINE WEB LISTING FOR THE BUSINESS IN THE ON-LINE DIRECTORY OPERATION 311 once the information associated with the business is obtained through the mobile phone, and/or other mobile computing system, and the on-line web-listing for the business is created at USE THE DATA REPRESENTING INFORMATION ASSOCIATED WITH THE BUSINESS FROM THE MOBILE APPLICATION AND THE MERCHANT MOBILE COMPUTING SYSTEM TO CREATE AN ON-LINE WEB LISTING FOR THE BUSINESS IN THE ON-LINE DIRECTORY OPERATION 309, the user is prompted to distribute at least part of the information associated with the business and/or the on-line web-listing address for the business to their customers.

As noted above, in one embodiment, the mobile application of PROVIDE A MOBILE APPLICATION INCLUDING, OR ASSOCIATED WITH, AN ON-LINE DIRECTORY OPERATION 303 provides the user the capability to obtain and store contact information for one or more current and/or potential customers of the business through, or on, the mobile application.

In one embodiment, a mobile customer database is provided through the mobile application of PROVIDE A MOBILE APPLICATION INCLUDING, OR ASSOCIATED WITH, AN ON-LINE DIRECTORY OPERATION 303 that includes a listing of one or more potential mobile customers and mobile computing system contact information for the potential mobile customers.

In one embodiment, the mobile customer database is a data storage device, such as database 170 of FIG. 1, a designated server system or computing system, such as computing system 120 of FIG. 1, or a designated portion of one or more server systems or computing systems, such as computing system 120 of FIG. 1, and/or merchant mobile computing system 100 of FIG. 1, and/or customer mobile computing system 150 of FIG. 1, or a distributed database, or an external and/or portable hard drive. In one embodiment, the mobile customer database is a dedicated mass storage device implemented in software, hardware, or a combination of hardware and software. In one embodiment, the mobile customer database is a web-based function. In various embodiments, the mobile customer database is any data storage mechanism, means, process and/or procedure, as discussed herein, and/or as known in the art at the time of filing, and/or as developed after the time of filing.

Returning to FIG. 3, in one embodiment, at least part of the initial listing of one or more potential mobile customers and mobile computing system contact information for the potential mobile customers in the mobile customer database is obtained by a user signing up and/or creating an account with the mobile application/system, such a mobile application 180 of FIG. 1, and creating a customizable virtual mobile number, i.e., a long code or short code.

Returning to FIG. 3, in one embodiment, the user then posts, or otherwise provides to customers and/or potential customers, their customizable virtual mobile number and informs the customers and/or potential customers that if they text their mobile contact information, such as a mobile telephone number, and in one embodiment, a defined keyword or character string, to the posted customizable virtual mobile number, their mobile contact information will be added to the listing of one or more potential mobile customers in the mobile customer database and/or the customers and/or potential customers will become eligible for special offers in the form of one or more mobile computing system based marketing devices.

In one embodiment, at NOTIFY CURRENT AND POTENTIAL CUSTOMERS OF THE BUSINESS OF IN THE ON-LINE WEB LISTING FOR THE BUSINESS IN THE ON-LINE DIRECTORY OPERATION 311, once the information associated with the business is obtained through the mobile phone, and/or other mobile computing system, and the on-line web-listing for the business is created, the user is prompted to distribute at least part of the information associated with the business and/or the on-line web-listing address for the business to their customers using the listing of one or more potential mobile customers and mobile computing system contact information for the potential mobile customers in the mobile customer database associated with the mobile application. This distribution will then begin virally spreading information about the business to help get the business discovered both on-line and via mobile devices.

As also discussed above, in one embodiment, the mobile application provides the user with the capability to create and/or distribute a mobile computing system based marketing device, such as a Short Message Service (SMS) message, that is associated with one or more products and/or services. In one embodiment, the mobile computing system based marketing device is designed to be distributed via mobile computing systems and/or networks. Herein, the term "marketing device" is used to denote any advertisements, coupons, discount certificates, discount vouchers, sales offers, and/or any other marketing tool and/or device and/or offer that is presented, and/or offered to, and/or obtained by, any customer/consumer in any format.

In one embodiment, the mobile computing system based marketing device includes customizable content. In one embodiment, the customizable content takes the form of one or more "hooks". In one embodiment, the one or more hooks are presented to the mobile customers as part of the mobile computing system based marketing device and appear within the computing system based marketing device, for instance at the beginning, or end, of the computing system based marketing device.

In one embodiment, the mobile application, such as mobile application 180 of FIG. 1, is accessed by the merchant using any computing system, such as merchant computing system 120 of FIG. 1, and/or as discussed herein, and/or as known in the art at the time of filing, and/or as developed after the time of filing. In one embodiment, the merchant creates a mobile computing system based marketing device, such as an Short Message Service (SMS) message, that is associated with one or more products and/or services through the mobile application. In one embodiment, the mobile computing system based marketing device is designed to be distributed via mobile computing systems.

Returning to FIG. 3, in one embodiment, the mobile computing system based marketing device is created through a specialized mobile application, such as mobile application 180 of FIG. 1, that is a marketing tool for small business owners and is offered by a third party.

As noted above, in one embodiment, the mobile computing system based marketing device includes customizable content. In one embodiment, the customizable content takes the form of the one or more hooks. In one embodiment, the one or more hooks are presented to the mobile customers as part of the mobile computing system based marketing device and appear within the computing system based marketing device, for instance, at the beginning, or end, of the computing system based marketing device.

As a specific illustrative example, in one embodiment, the one or more hooks are presented to the mobile customers on the bottom of an SMS mobile computing system based marketing device and request the mobile customer to send an SMS text message response to a customizable virtual mobile number associated with the merchant in order to receive a marketing device, such as a coupon or discount voucher or any other marketing device as discussed herein, and/or as known in the art at the time of filing, and/or as developed after the time of filing.

As another specific illustrative example, in one embodiment, the one or more hooks are presented to the mobile customers on the bottom of an SMS mobile computing system based marketing device to inquire about the mobile customer's interest level in the product and/or service and/or specific offer. In one specific example, the mobile customer is encouraged to SMS back to the customizable virtual mobile number the mobile customer's interest level in the offer set forth in the particular mobile computing system based marketing device via a rating. As an example, the customer can send "1" to show they want to redeem the offer set forth in the particular mobile computing system based marketing device, or "2" to say they do not want to redeem the offer set forth in the particular mobile computing system based marketing device.

In various embodiments, the mobile computing system based marketing device and/or one or more hooks are further customizable to meet the specific needs of the given merchant and/or a given potential mobile customer.

In one embodiment, at NOTIFY CURRENT AND POTENTIAL CUSTOMERS OF THE BUSINESS OF IN THE ON-LINE WEB LISTING FOR THE BUSINESS IN THE ON-LINE DIRECTORY OPERATION 311, once the information associated with the business is obtained through the mobile phone, and/or other mobile computing system, and the on-line web-listing for the business is created, the user is prompted to distribute at least part of the information associated with the business and/or the on-line web-listing address for the business to their customers along with one or more of the computing system based marketing devices.

In one embodiment, at least part of the information associated with the business and/or the on-line web-listing address for the business and the one or more mobile computing system based marketing devices are distributed to selected mobile customers in the mobile customer database via their mobile computing systems and/or any other customer computing systems.

In one embodiment, at least part of the information associated with the business and/or the on-line web-listing address for the business and the one or more mobile computing system based marketing devices are distributed to selected mobile customers via their mobile computing systems, such as customer mobile computing system 150 of FIG. 1, and/or one or more mobile computing system networks such as, network 130 of FIG. 1 and/or including, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 3, in one embodiment, at least part of the information associated with the business and/or the on-line web-listing address for the business and the one or more mobile computing system based marketing devices are distributed to selected mobile customers via their mobile computing systems in the form of an SMS or other text message.

In one embodiment, at least part of the information associated with the business and/or the on-line web-listing address for the business and the one or more mobile computing system based marketing devices are distributed to selected mobile customers that include all mobile customers in the mobile customer database.

In one embodiment, at least part of the information associated with the business and/or the on-line web-listing address for the business and the one or more mobile computing system based marketing devices are distributed to selected mobile customers that are a sub-set of all the mobile customers in the mobile customer database.

In one embodiment, at least part of the information associated with the business and/or the on-line web-listing address for the business and the one or more mobile computing system based marketing devices are distributed to selected mobile customers that is a super-set of mobile customers including all the mobile customers in the mobile customer database.

In one embodiment, one or more of the selected mobile customers who receive the mobile computing system based marketing device respond, or fail to respond, to the mobile computing system based marketing device.

In one embodiment, one or more of the selected mobile customers who receive the mobile computing system based marketing device respond, or fail to respond, to the mobile computing system based marketing device by: providing a response to the one or more hooks provided in the mobile computing system based marketing device including, in one embodiment, responding to a hook requesting the mobile customer to send an SMS text message response to a customizable virtual mobile number associated with the merchant in order to receive a marketing device, such as a coupon or discount voucher; not providing a response to the one or more hooks provided in the mobile computing system based marketing device; accepting/redeeming the offer set forth in the mobile computing system based marketing device; and/or not accepting/redeeming the offer set forth in the mobile computing system based marketing device.

In one embodiment, the responses of the selected mobile customers are monitored and response data is generated that represents respective responses, or lack of responses, of the selected mobile customers.

In one embodiment, the responses, or lack of responses, from one or more of the selected mobile customers who receive the mobile computing system based marketing device are tracked and/or monitored by one or more processors, such as CPUs 101 and/or 121 of FIG. 1, associated with one or more computing systems, such as computing system 120 of FIG. 1 and/or merchant mobile computing system 100 of FIG. 1, associated with the mobile application, such as mobile application 180 of FIGS. 1 and 2, and/or a provider of the mobile application.

In various embodiments, by distributing one or more computing system based marketing devices along with at least part of the information associated with the business and/or the on-line web-listing address for the business to potential customer right after the creation of the on-line web-listing, the user can increase the spread of their viral network and can track which customers received and/or redeemed the one or more computing system based marketing devices.

In various embodiments, once the information associated with the business is obtained through the mobile phone, and/or other mobile computing system, and the on-line web-listing for the business is created, the user can use the mobile web or a WAP version of the mobile application to view their on-line web-listing on the merchant mobile phone, or other mobile computing system, or the user can view, and/or edit, the on-line web-listing for the business using a traditional computing system with traditional Internet access.

In one embodiment, once the user is prompted to distribute at least part of the information associated with the business and/or the on-line web-listing address for the business out to their customers at NOTIFY CURRENT AND POTENTIAL CUSTOMERS OF THE BUSINESS OF IN THE ON-LINE WEB LISTING FOR THE BUSINESS IN THE ON-LINE DIRECTORY OPERATION 311, process flow proceeds to EXIT OPERATION 330. In one embodiment, at EXIT OPERATION 330, process for creating a web listing using a mobile phone 300 is exited to await new data.

Using one embodiment of process for creating a web listing using a mobile phone 300, small business owners, or other merchants and/or product marketers, can establish an Internet or web presence for their businesses without having to dedicate the resources and time needed to create a traditional website. Consequently, these business owners can easily and efficiently seize the opportunity to advertise via the Internet and consumers can be provided the opportunity to find the products and services offered by these businesses that they desire.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating", "distributing", "responding", "transferring", "using", "determining", "generating", "obtaining", "identifying", "analyzing", "presenting", "storing", "saving", "displaying", "categorizing", "providing", "processing", "notifying", "monitoring" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for creating a web listing using a mobile phone comprising the following of which a plurality are each executed via any set of one or more processors:

provide data representing information about a business to a mobile application;

receiving information about the business from a mobile application;

creating an on-line web listing for the business using the information about the business, the on-line web listing for the business including at least part of the information about the business;

making the on-line web listing for the business accessible via a network;

creating a mobile customer database, the mobile customer database including a listing of one or more current or potential mobile customers of the business and mobile contact information for the current or potential mobile customers;

distributing notification of the on-line web listing for the business to one or more current or potential mobile customers of the business using the contact information for the current or potential mobile customers;

creating a mobile computing system based marketing device, the mobile computing system based marketing device being associated with products or services offered by the business, the mobile computing system based marketing device including one or more hooks, the one or more hooks requesting a text message based response from a recipient of the mobile computing system based marketing device; and distributing the mobile computing system based marketing device to the one or more current or potential mobile customers of the business along with the notification of the on-line web listing for the business using the contact information for the current or potential mobile customers.

2. The computing system implemented process for creating a web listing using a mobile phone of claim 1, wherein
at least part of the information about the business is one or more selected from one or more of the group of information about the business consisting of:
the business name;
the business location/address;
a phone number associated with the business; and
a description of at least one of the products or services offered by the business.

3. The computing system implemented process for creating a web listing using a mobile phone of claim 1, wherein
providing data representing information about a business to a mobile application is part of a process for obtaining access to the mobile application that includes obtaining access to the on-line directory service.

4. The computing system implemented process for creating a web listing using a mobile phone of claim 1, wherein
providing data representing information about a business to a mobile application is part of a process for establishing an account through the mobile application and creating a customizable virtual mobile number.

5. The computing system implemented process for creating a web listing using a mobile phone of claim 1, further comprising:
distributing notification of the on-line web listing for the business to one or more current or potential customers of the business.

6. The computing system implemented process for creating a web listing using a mobile phone of claim 1, wherein
the mobile computing system based marketing device is a Short Message Service (SMS) message.

7. A method for creating a web listing using a mobile phone comprising:
providing data representing information about a business to a mobile application;
receiving information about the business from a mobile application;
creating an on-line web listing for the business, the on-line web listing for the business including at least part of the information about the business;
making the on-line web listing for the business accessible via a network;
creating a mobile customer database, the mobile customer database including a listing of one or more current or potential mobile customers of the business and mobile computing system contact information for the current or potential mobile customers;

distributing notification of the on-line web listing for the business to one or more current or potential mobile customers of the business using the contact information for the current or potential mobile customers;

creating a mobile computing system based marketing device, the mobile computing system based marketing device being associated with products or services offered by the business, the mobile computing system based marketing device including one or more hooks, the one or more hooks requesting a text message based response from a recipient of the mobile computing system based marketing device; and distributing the mobile computing system based marketing device to the one or more current or potential mobile customers of the business along with the notification of the on-line web listing for the business using the contact information for the current or potential mobile customers.

8. The method for creating a web listing using a mobile phone of claim 7, wherein;
at least part of the information about the business is one or more selected from one or more of the group of information about the business consisting of:
the business name;
the business location/address;
a phone number associated with the business; and
a description of at least one of the products or services offered by the business.

9. The method for creating a web listing using a mobile phone of claim 7, wherein
providing data representing information about a business to a mobile application is part of a process for obtaining access to the mobile application that includes obtaining access to the on-line directory service.

10. The method for creating a web listing using a mobile phone of claim 7, wherein
providing data representing information about a business to a mobile application is part of a process for establishing an account through the mobile application and creating a customizable virtual mobile number.

11. The method for creating a web listing using a mobile phone of claim 7, further comprising:
distributing notification of the on-line web listing for the business to one or more current or potential customers of the business.

12. A computing program product for creating a web listing using a mobile phone comprising:
a nontransitory computer readable storage medium having instructions stored therein which when executed by any set of one or more processors perform:
providing data representing information about a business to a mobile application;
receiving information about a business from a mobile application;
creating an on-line web listing for the business using the information about the business, the on-line web listing for the business including at least part of the information about the business;
making the on-line web listing for the business accessible via a network;

creating a mobile customer database, the mobile customer database including a listing of one or more current or potential mobile customers of the business and mobile contact information for the current or potential mobile customers; and distributing notification of the on-line web listing for the business to the one or more current or potential mobile customers of the business using the contact information for the current or potential mobile customers;

creating a mobile computing system based marketing device, the mobile computing system based marketing device being associated with products or services offered by the business, the mobile computing system based marketing device including one or more hooks, the one or more hooks requesting a text message based response from a recipient of the mobile computing system based marketing device; and distributing the mobile computing system based marketing device to the one or more current or potential mobile customers of the business along with the notification of the on-line web listing for the business using the contact information for the current or potential mobile customers.

13. The computing program product for creating a web listing using a mobile phone of claim 12, wherein
at least part of the information about the business is one or more selected from the one or more of the group of information about the business consisting of:
the business name;
the business location/address;
a phone number associated with the business; and
a description of at least one of the products or services offered by the business.

14. The computing program product for creating a web listing using a mobile phone of claim 12, wherein
providing data representing information about a business to a mobile application is part of a process for obtaining access to the mobile application that includes obtaining access to the on-line directory service.

15. The computing program product for creating a web listing using a mobile phone of claim 12, wherein
providing data representing information about a business to a mobile application is part of a process for establishing an account through the mobile application and creating a customizable virtual mobile number.

16. The computing program product for creating a web listing using a mobile phone of claim 12, further comprising:
distributing notification of the on-line web listing for the business to one or more current or potential customers of the business.

17. The computing program product for creating a web listing using a mobile phone of claim 12, wherein
the mobile computing system based marketing device is a Short Message Service (SMS) message.

* * * * *